Nov. 14, 1939.   A. J. SCHLUETER   2,179,758
FISH SCALER
Filed Nov. 29, 1937

Inventor
Arthur J. Schlueter
By Clarence A. O'Brien
Hyman Berman
Attorneys

Patented Nov. 14, 1939

2,179,758

UNITED STATES PATENT OFFICE 2,179,758

FISH SCALER

Arthur J. Schlueter, Watertown, Wis.

Application November 29, 1937, Serial No. 177,095

2 Claims. (Cl. 17—7)

This invention appertains to new and useful improvements in implements whereby fish can be scaled.

The principal object of the present invention is to provide a fish scaler which will be handy to employ and which is adaptable for scaling fish with either small scales or large scales.

Another important object of the invention is to provide a scaler of the character stated which will be positive acting in use and which will be durable.

These and various other important objects and advantages of the invention will become apparent to the reader of the following specification.

Figure 1:
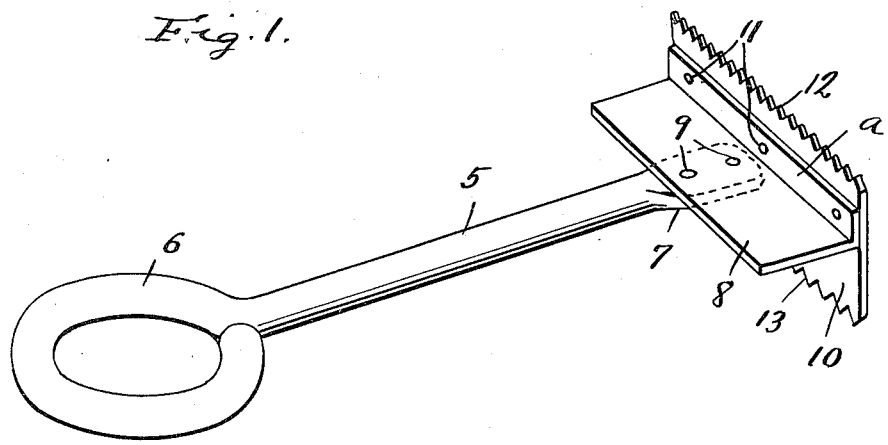
Figure 1 represents a perspective view of the scaler.
Figure 2:
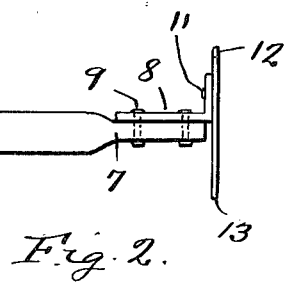
Figure 2 represents a side elevational view of the scaler.
Figure 3:
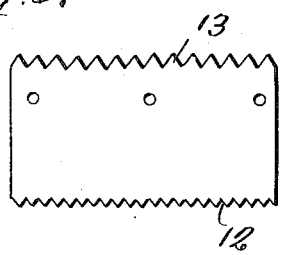
Figure 3 represents a front view of the blade.

Referring to the drawing wherein like numerals designate like parts, it can be seen that numeral 5 denotes an elongated handle preferably of steel which has one end bent in a circle as at 6. The other end of the handle 5 is flattened as at 7 and across this is disposed the angle member 8. Rivets 9 are employed for securing this angle member in place against the flat end portion 7 of the handle 5, while the laterally disposed flange portion a of the angle member 8 has the blade 10 secured thereto by rivets 11. This blade 10 is of rectangular shape and has one longitudinal edge portion provided with fine serrations or teeth 12 for use in removing small scales and its opposite longitudinal edge portion provided with larger serrations or teeth 13 for removing larger scales.

It is preferable that the blade 10 and angle member 8 be of suitable metal so that rusting will not occur.

As can be seen in Figure 1, it is desirable to have the handle secured by the angle member 8 to the blade 10 adjacent the fine toothed edge thereof.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A fish scaler comprising a handle, a blade secured to one end of the handle, said blade being of rectangular shape and having fine teeth at one longitudinal edge thereof and larger teeth at its other longitudinal edge portion, said handle being secured to the blade at a point nearer the edge portion having the fine teeth than the edge portion having the larger teeth.

2. A fish scaler comprising a handle, a blade, an angle member secured to the blade and extending longitudinally thereof and terminating at the ends of the blade, said handle being secured to the intermediate portion of an outstanding portion of the said angle member, one longitudinal edge portion of the blade being provided with fine teeth and the other longitudinal edge portion of the blade being provided with large teeth, said angle member being secured to the other blade adjacent the fine toothed edge portion.

ARTHUR J. SCHLUETER.